(12) United States Patent
Graham et al.

(10) Patent No.: US 7,770,057 B1
(45) Date of Patent: Aug. 3, 2010

(54) SYSTEM AND METHOD FOR CUSTOMIZED DISASTER RECOVERY REPORTS

(75) Inventors: Debra H. Graham, Seattle, WA (US); William R. Weisgerber, Lake Mary, FL (US)

(73) Assignee: Symantec Operating Corporation, Mountain View, CA (US)

( * ) Notice: Subject to any disclaimer, the term of this patent is extended or adjusted under 35 U.S.C. 154(b) by 641 days.

(21) Appl. No.: 11/260,840

(22) Filed: Oct. 27, 2005

(51) Int. Cl.
*G06F 11/00* (2006.01)
(52) U.S. Cl. .......................................... 714/6
(58) Field of Classification Search ....................... 714/6
See application file for complete search history.

(56) References Cited

U.S. PATENT DOCUMENTS

| | | | |
|---|---|---|---|
| 5,452,454 A | 9/1995 | Basu | 713/2 |
| 5,828,887 A | 10/1998 | Yeager et al. | 717/167 |
| 5,930,824 A | 7/1999 | Anglin et al. | 711/162 |
| 6,243,830 B1 * | 6/2001 | Nakatsugawa | 714/15 |
| 6,317,826 B1 | 11/2001 | McCall et al. | 713/1 |
| 6,931,558 B1 * | 8/2005 | Jeffe et al. | 713/340 |
| 6,990,602 B1 * | 1/2006 | Skinner et al. | 714/4 |
| 7,036,040 B2 * | 4/2006 | Nicholson et al. | 714/6 |
| 7,069,473 B2 * | 6/2006 | Yasuda | 714/37 |
| 7,117,386 B2 * | 10/2006 | LeCrone et al. | 714/6 |
| 7,162,599 B2 * | 1/2007 | Berkowitz et al. | 711/162 |
| 7,191,324 B2 * | 3/2007 | Machida | 713/1 |
| 7,210,120 B2 * | 4/2007 | Reyna | 717/106 |
| 7,243,267 B2 * | 7/2007 | Klemm et al. | 714/38 |
| 7,343,401 B2 * | 3/2008 | Tachibana et al. | 709/220 |
| 7,603,583 B2 * | 10/2009 | Yamamoto et al. | 714/7 |
| 7,610,362 B2 * | 10/2009 | Takamoto et al. | 709/220 |
| 2005/0075748 A1 * | 4/2005 | Gartland et al. | 700/108 |
| 2007/0220308 A1 * | 9/2007 | Yeung et al. | 714/5 |
| 2009/0199041 A1 * | 8/2009 | Fukui et al. | 714/6 |

OTHER PUBLICATIONS

VERITAS Software Corporation, "VERITAS Backup Exec™ 9.1 for Windows Servers, Intelligent Disaster Recovery™ Option", 2003, pp. 1-9.

* cited by examiner

*Primary Examiner*—Michael C Maskulinski
*Assistant Examiner*—Amine Riad
(74) *Attorney, Agent, or Firm*—Campbell Stephenson LLP

(57) ABSTRACT

Data protection systems and methods may be used to automatically gather and assemble configuration information needed for the successful recovery of distributed applications running on several servers. In one implementation, a data protection system includes a collection module and a recovery report generation module. The collection module may gather configuration information regarding several servers used by a distributed application. The configuration information may include information regarding data archived from the servers and information for restoring the archived data, such as hardware configurations and path locations of original data stored on the servers and of archived data. The recovery report generation module may assemble recovery instructions based on the configuration information. The recovery instructions may be usable for restoring the distributed computing system in the event of a disaster or other failure involving one or more of the servers.

30 Claims, 9 Drawing Sheets

SYSTEM AND METHOD FOR CUSTOMIZED DISASTER RECOVERY REPORTS

FIELD OF THE INVENTION

The present invention relates generally to backup and disaster recovery, systems for data protection, and more specifically to the protection of data across multiple networked platforms.

DESCRIPTION OF THE RELATED ART

Modern data storage systems may store data crucial to the usual operations of a business endeavor. A disaster affecting a data center may cause days or even weeks of unplanned downtime and data loss that could threaten an organization's productivity. For businesses that increasingly depend on data and information for their day-to-day operations, such unplanned downtime may also impact their reputations and bottom lines. Businesses are becoming increasingly aware of these costs and are taking measures to plan for and recover from disasters.

One basic strategy for protecting data includes backing up data onto a backup server or a removable storage medium such as magnetic tape or optical disks. Duplicate copies of backup data may be stored onsite and offsite. After a catastrophic failure of multiple elements as might occur in a natural disaster such as an earthquake or as might be inflicted as deliberate sabotage or terrorist attack, the backup data may be collected and re-installed on the original data servers—or on replacement data servers, if needed.

The effort required to restore an entire data system may vary depending on the complexity of the data system. For example, a single workstation may require only a backup set of installation disks for recovering system and application software, a connection to a tape server for recovering lost data, and a few person-hours of effort to implement the recovery operations. In contrast, the recovery of a multiple-server system distributed over several sites and involving a large number of distinct applications may require more effort and resources. The difficulty may be compounded if the distributed system makes use of several independent backup procedures for several different types of application data. In general, the difficulty of a restoration task may scale non-linearly with the number of applications or servers being restored.

What is needed is a facility that assists a system administrator to manage the restoration of a multi-resource data management system. Such a facility may be useful in some circumstances to accelerate the process of recovering from the failure of one or more components in the distributed system. In various situations, such a facility may also reduce the effort required to perform the data restoration, and may also enhance the overall fidelity of the data restoration.

SUMMARY OF THE INVENTION

Described herein are systems and methods for data protection of data systems whose execution may be distributed among multiple computers in a distributed computing system with multiple server computers. In one implementation, a data protection system includes a collection module and a recovery report generation module. The collection module may gather configuration information regarding several servers used by a distributed application. The configuration information may include information regarding data archived from the servers and information for restoring the archived data. For example, the configuration information may include information regarding the structure of original data stored on the servers, path locations of original data stored on the servers, path locations of archived data, hardware configurations of the servers, and user-selected parameters for applications on the servers.

The collection module may be configured to monitor data servers in the distributed system and to gather configuration information as needed to maintain an updated collection of information that would be needed for a recovery. The gathering may be done, for example, whenever a data backup occurs on a server in the distributed system. The collection module may also be configured to discover locations of the needed configuration information in the distributed system.

The recovery report generation module may assemble recovery instructions based on the configuration information. The recovery instructions may be usable for restoring the distributed computing system in the event of a disaster or other failure involving one or more of the servers. The recovery instructions may be in the form of printed instructions for administrators involved in disaster recovery, or may be in various electronic formats that are user-readable or executable by an automated recovery tool.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

Figure 1:
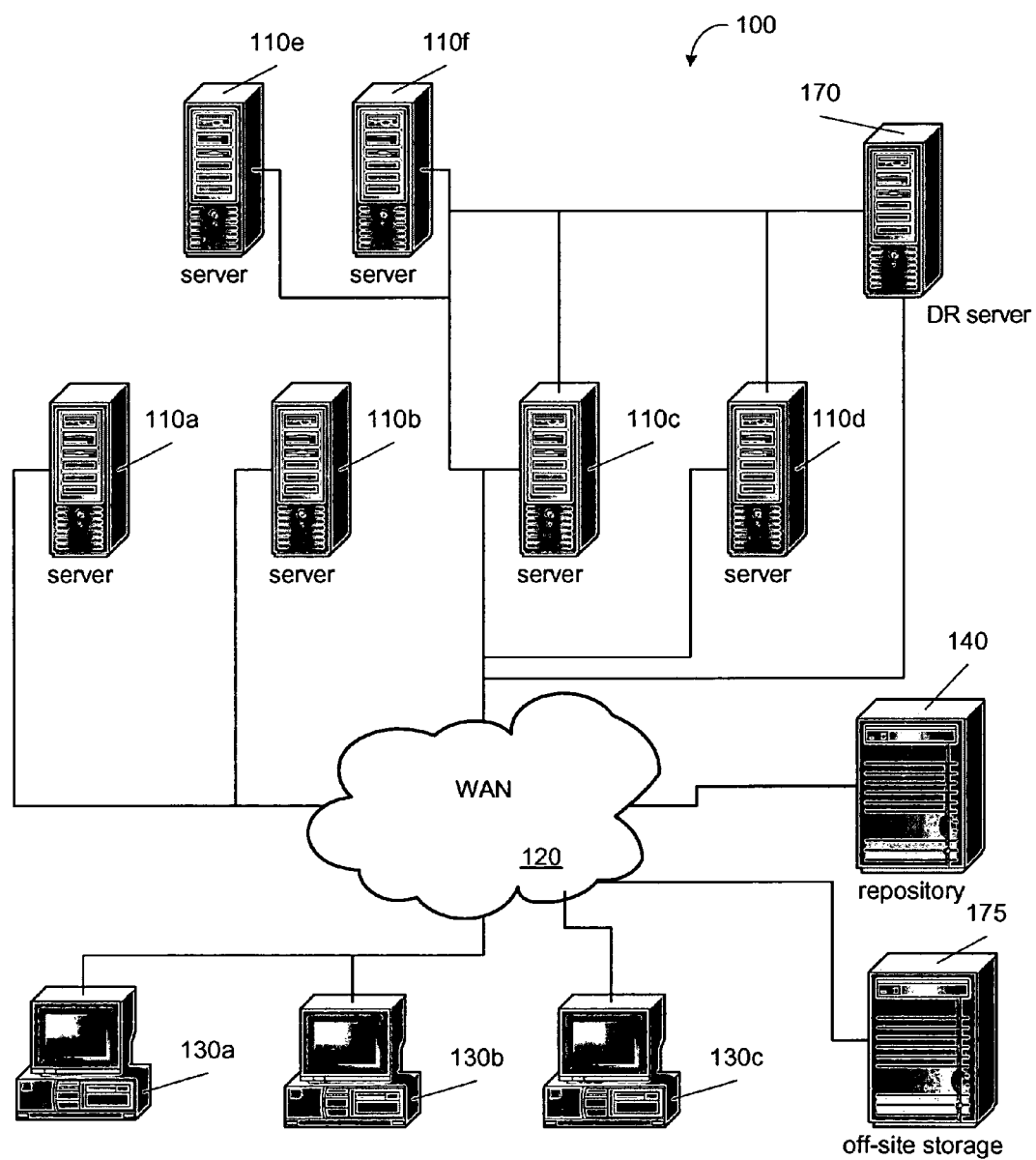
FIG. 1 is a block diagram of one implementation of a network environment configured with tools for facilitating the recovery of data for multiple applications on multiple servers.

FIG. 1 is a block diagram of one implementation of a network environment 100 configured with tools for facilitating the recovery of data for multiple applications on multiple servers. The environment 100 includes several servers 110*a*, 110*b*, 110*c*, 110*d*, 110*e*, and 110*f*. In the illustrated example, the servers 110*a* and 110*b* are at a common location, and the servers 110*c* and 110*d* are at a different second location. In other implementations of the environment, the servers may be located at one, three, or more locations. The servers may execute a variety of applications to provide various types of data-hosting capabilities to clients. The servers 110*a-f* may be coupled to a wide area network (WAN) 120, such as the Internet, and may be accessible to various clients 130*a*, 130*b*, and 130*c* through the WAN. The servers may also be coupled through the WAN to a data repository 140 that may be used during regular operations of a distributed application as a repository for application data. The servers may further be coupled through the WAN to an off-site data storage facility 175. Alternatively, or in addition, the off-site data storage facility 175 may be accessed through the use of portable media, such as backup tapes or other removable media.

More and more, critical enterprise application functionality is being distributed among multiple computers. Further, the computers may be located at one or more physical sites. Distributed application architecture brings with it a need for different management strategies in terms of data protection. This need may be seen in a variety of situations. For example, an application may include several types of servers, each with different data protection and recovery requirements. Further, on a day-to-day basis, servers may be added to or removed from a group of servers, and backup plans for the application may need to be altered to support the new configuration of servers. On a related note, the administrator of a distributed application may be a different person than the administrator who manages data-backup operations. Nonetheless, the application administrator may typically need to know the status of daily backups as part of the job of monitoring the overall health of the distributed application, and may need to be familiar with an overall disaster recovery plan so that the plan may be readily and smoothly executed when needed.

In a site disaster recovery scenario, administrators may need to be able to identify the local servers that support each of the various distributed applications in use, and may need to prioritize the recovery of the servers so as to bring the application back online efficiently, and in line with business continuance requirements. Individual data-backup applications may be used to create and maintain backup copies of the data on various servers. For example, backup software running on the servers 110*a-f* may be used to create and maintain archives of databases on the servers. The archives may be stored locally on the servers or on another facility, such as the data repository 140 or the off-site data storage facility 175. However, when a system administrator turns to the archives after a system failure or disaster, the process of recovering the archived data and restoring the servers may involve a complex series of manual and automated operations. The operations may be complicated by various factors, such as: restoring or replacing the hardware that the distributed application uses; restoring system software on the various servers; re-configuring directory structures on the servers; restoring application software and supporting software on the servers; restoring registry information on the various servers; restoring path links on the various servers; and restoring the data sets onto the servers; among others. Further, these steps may generally need to be performed in a particular order, since various steps in the overall system restoration may depend on other steps for successful completion.

Still further, as an initial matter, a system operator may need to identify all of the hardware elements that need to be restored. This task may be complicated by the fact that various servers and other computing elements may be located at remote locations with which the system operator may not be familiar. Along with deciding which hardware elements need attention, the system operator may generally need to also identify all the software components, and associated databases, that require attention during the restoration operation. As an added layer of complexity, the system operator may need to initially restore a network configuration prior to initiating other recovery steps.

To assist in recovery operations that may be needed in the event of a disaster or other failure event, the servers 110*a-f* may be monitored by a system protection tool. The system protection tool may be customized for use with a particular distributed application. Alternatively, the system protection tool may be configurable for use with a variety of distributed applications. As further described below, the system protection tool may be implemented on one or more of the servers 110*a-f*. Alternatively, or in addition, the system protection tool may be executed on a local or remote disaster-recovery server 170 that may be accessible to the other servers either directly or through the WAN. The system protection tool may be configured to assist in the recovery of data used by services that are distributed across multiple computers. The system protection tool may also assist in the recovery of applications that provide the services. Further, the system protection tool may assist in the recovery of system hardware, system software, and system configurations used by the applications.

The system protection tool may be used, for example, in situations involving distributed applications. Distributed applications may be deployed in systems such as the environment 100. In the environment 100, the servers 110*a-f* may execute a variety of applications to provide various types of services to the clients. For example, the servers 110*a-f* may execute front-end applications for internet web servers, back-end applications in support of various front-end applications, file backup and recovery applications, voice communications applications, video communications applications, email applications, instant messaging applications, database server applications, or data processing applications, or other applications, or combinations thereof.

The services provided by the servers 110*a-f* may depend on the functioning of several individual computers. Depending on the type of service, the computers may be located at one site or at more than one site. Communications applications, for example, may rely on multiple data servers managed by a single entity but deployed at multiple locations. An enterprise's ability to function may rely on the health of such applications. Communications applications may provide various combinations of services, such as secure messaging using instant messaging and telephone connections. A distributed communication application may also support archiving of instant message data. One example of such an application is Microsoft Office® SharePoint Portal Server. Another example is Microsoft® Live Communications Server (LCS).

An enterprise may deploy a distributed application using multiple servers, such as the servers 110*a-f*. Depending on the amount of use that an enterprise makes of the applications, the enterprise may depend heavily on distributed software for day-to-day operations. If a distributed communications application is either partially or completely disabled, for example through a hardware failure, a network failure, or a software failure, various communications in an enterprise may be disrupted. The disruption may impact both internal and external communications for the enterprise.

An example of a server arrangement illustrates the interdependence of various components in a distributed environment. A distributed application may employ various types of the servers 110*a-f*, with each server holding different types of data, and with varying importance to the functionality of the overall system. A typical large distributed topology may include several front-end servers and several back-end servers. By way of illustration, the servers 110*a-d* in FIG. 1 may be configured as front-end servers, interfacing with the clients 130*a-c* through the WAN 120. Similarly, the servers 110*e-f* may be configured as back-end servers, supporting the clients and also accessible to the front-end servers. Various servers may function as a group; for example the servers 110*a-d* may together form an Enterprise Pool for an LCS application. A distributed application may also employ an archiving server, such as the repository 140.

A distributed communications application may use front-end servers to process user connection requests. To manage the requests, each front-end server may hold a small infrequently-changing database for directing users to their back-end servers. A back-end server may hold the specific data for a set of users in another set of databases. It may manage information regarding the location of users and may route user messages accordingly. An archive server may maintain a continuously growing repository of email, call logging, instant messages, or other information, or combinations thereof, sent through the communications application.

The failure of a single front-end server, such as the server 110*c*, may not prevent clients 130*a-c* from gaining access to the communications tools, but failure of a back-end server, such as the server 110*f*, may mean that all users assigned to that server are unable to communicate until that server is recovered. A similar point of sensitivity may be an archive server, if the communications application requires archiving for regular operation of various services. For example, a distributed communications system may require archiving for operation of instant messaging (IM) services, and may use the repository 140 to store the needed archives. In such a situation, a failure of the repository 140 may bring instant messaging to a halt for all users. Thus, a quick recovery of some servers, such as a back-end server or archive server, may be essential, while recovery of other servers, such as a front-end server, is not as urgent. Based on the data to be saved for each server type and its importance to the application's ability to function, backup requirements for each server type differ. In a site disaster recovery scenario, administrators may therefore need to be able to identify essential servers quickly in order to bring users online in accordance with a site disaster recovery plan.

Various features of a data protection system may allow a system manager to create a data protection plan for a distributed application. Such features may include regular automated data backup operations, and backup duplication operations. Another useful feature in a data protection system is a tailored set of instructions that may be used by backup administrators and/or application administrators for rapidly and thoroughly carrying out restoration operations during a recovery from a failure.

The recovery instructions may include hardware restoration instructions, software restoration instructions, or implementation instructions, or combinations thereof. The instructions may be prepared so that they are carried out automatically, for example by a program script. Alternatively, or in combination, the instructions may be carried out manually, after being automatically compiled in a formatted report for use by an administrator. The restoration instructions may be collected for an existing distributed application by examining the hardware, software, and databases used by the distributed application, as well as various network settings and other settings used to implement the distributed application in a particular environment.

Figure 2:
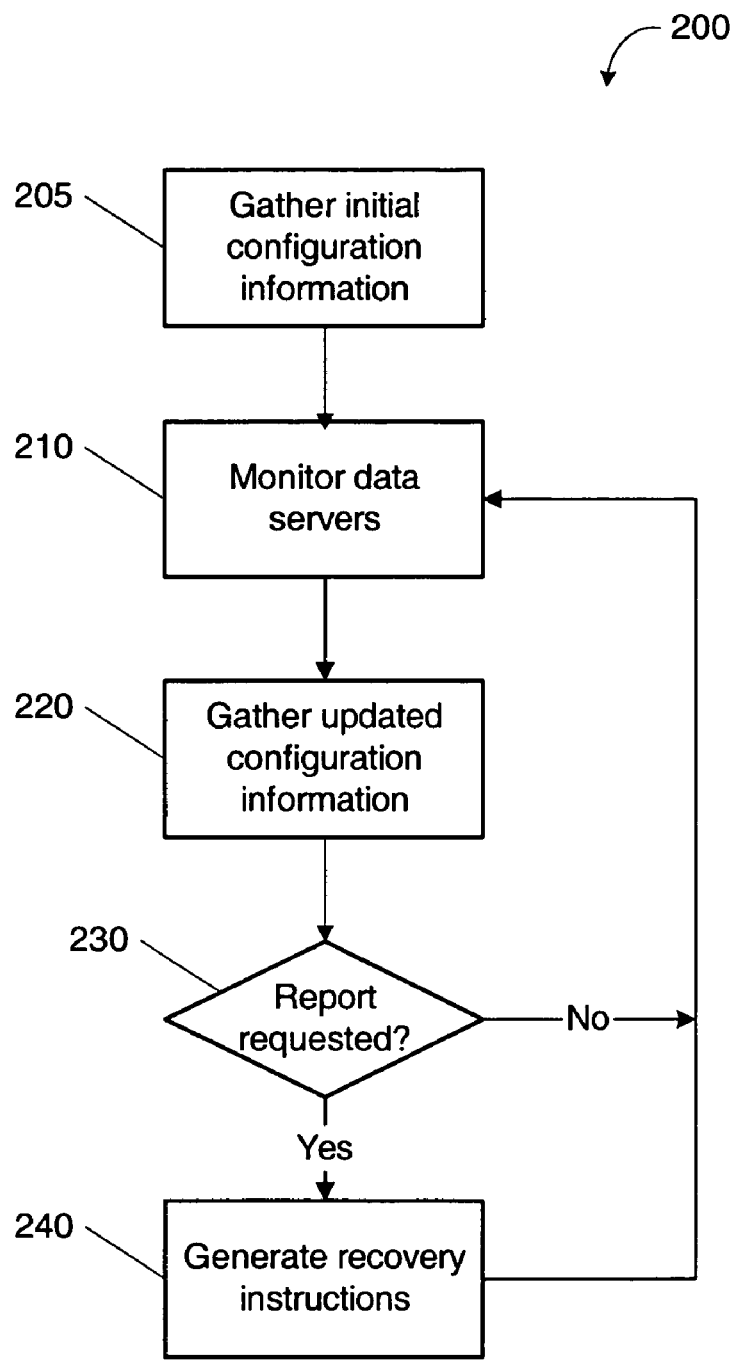
FIG. 2 is a flow diagram of general operations in one implementation of a procedure executed by a data protection system.

FIG. 2 is a flow diagram of general operations in one implementation of a procedure 200 executed by a data protection system. The procedure may begin in act 205 by initially gathering information relevant to the recovery of a distributed application. The gathering may include collecting information such as the configuration of hardware, software, network topology, system settings, and software settings used by the distributed application. This information may be gathered from data servers, network devices, processing nodes, and/or other components that are used by a distributed application.

The information gathered in act 205 may be actively sought by the data protection system, using network-crawling tools, for example. Alternatively, or in conjunction, the gathered data may be provided to the data protection system by tools installed on the various components of the distributed system. Other approaches to gathering information are also envisioned. For example, the gathering may be performed by monitoring data flows among various system components. The gathering may be performed largely or completely automatically by various software tools. The gathering may be carried out by agents, scripts, daemons, or other tools running on data servers such as the servers 110*a-f*, 140, and 170 from FIG. 1. Alternatively, or in addition, the monitoring may be performed by software running from a centralized location, such as the disaster-recovery server 170. These various tools may automatically seek and gather information relevant to the recovery of a distributed application.

Such automation may be helpful to ensure a complete set of relevant information is gathered for use (if needed) in restoring a distributed application. Distributed systems are generally configured manually on a station-by-station basis. Information regarding the inter-relationships of each component in the environment may need to be manually entered and checked during an initial set-up or modification of a distributed system. The initial gathering 205 may involve user input regarding the types of information to be gathered and indications of where and how the information may be found. Once the environment of a distributed system is completed, the result may generally be a unique arrangement of elements that is complex and difficult to describe. Thus, the act 205 may itself be helpful for self-documenting the overall configuration of a distributed system upon first operation of the system. The various tools used to gather the relevant recovery information may then report the collected information back to a central location such as the disaster-recovery server 170.

The procedure may continue in act 210 by monitoring data servers, network devices, processing nodes, and/or other components that are used by a distributed application. The procedure may continue to gather relevant information from the various sources in act 220. This gathering may continue to during ongoing operations of the distributed application, so that the information may be updated as needed.

The gathering in act 210 may be performed continuously, so that the collected information is kept up to date during operations of the distributed system. To simplify the gathering activities, however, the ongoing gathering in act 210 may be performed in response to the monitoring from act 210. For example, the gathering tools may abstain from updating some relatively static information until the monitoring in act 210 detects a change in such information.

Similarly, the monitoring in act 210 may check for local backup events, in which system software or other system components occasionally make backup copies of individual databases or data-server conformation or other components of the environment. The gathering in act 220 may then be triggered to update a collection of recovery information to include information on the newly available backup copies, such as the time the backup copies were created, the data paths or locations of the backup copies, and other information usable to restore the backup copies.

The gathering in act 220 may include collecting information on the location and configuration of various databases used by the distributed application, as well as the location and configuration of backup databases that store redundant copies of the information used by the distributed application. The gathering in act 220 may also detect and record additions and changes made to hardware and software in the distributed system. The various tools used to gather the relevant recovery information may then report the collected information back to a central location such as the disaster-recovery server 170.

This ongoing data gathering may be performed automatically. After an initial set up, the data protection system may gather relevant recovery information with little or no participation by an administrator. For example, the data protection system may examine individual data-protection jobs to detect changes in a distributed application server set. Users of the distributed system may specify jobs that are run on a scheduled basis to protect data associated with their network. These individual data-protection jobs may be performed as a regular feature of ongoing system operations. These data-protection jobs may be monitored to harvest information that describes the portions of the server set involved in the data-protection jobs. The data protection system may extract this information about each server in the server set and may update a structural model of the distributed application if the information indicates that a server has been added, removed, or changed in the server set.

In the event of a failure of one or more data servers or other components used by a distributed application, an administrator or an automated recovery manager may request that the gathered information be used to generate a report to assist in a recovery of the distributed application. The request may also be made during normal operation of the distributed application, so that it is ready in advance for use in the event of a failure. The request may be made manually, or on a regular basis (e.g. daily, weekly) as part of a protective procedure. The procedure may periodically or continuously check for such a request in act 230. In the event of such a request, the procedure may generate a set of recovery instructions in act 240. Otherwise, the procedure may return to the regular monitoring in act 210.

Recovery instructions may be helpful when it is necessary to reconstruct portions of the distributed system (or the entire system), for example after a catastrophic failure of one or more elements in the system. Such a failure might occur, for example, in a natural disaster such as an earthquake or as a result of deliberate sabotage or other attack. The information collected in acts 205-220 may be used to guide restoration of the distributed system. The information may be used to generate a report that may serve as an administrator's guide of steps needed for an efficient system recovery. For example, the report information may include instructions for manual steps in restoring data servers in the distributed system. Alternatively, or in addition, the information may be used to automate a restoration process for the distributed system. For example, the recovery instructions may include computer-executable instructions for steps in restoring the data servers.

The recovery instructions generated in act 240 may take the form of a report for precisely guiding restoration of a system that has suffered some substantial failure. The report may include and describe hard-to-obtain information that is unique to each individual data server or to other components in a set of servers used in a distributed application. The report information may be gathered automatically during operations, as illustrated in act 220, thereby collecting restoration information with little or no operator intervention. Depending upon the details of the deployment of the procedure in FIG. 2, the resulting report may be based upon complete and current information, making the report more accurate than may be obtained by a manual recording method that involves only occasional examination of individual elements in a distributed set of servers.

A variety of steps may be included in the recovery instructions to address diverse features of the distributed system. Different implementations of the data protection system may include different types of recovery instructions. System administrators may also adjust the operation of the data protection system according to the needs of a particular implementation of a distributed application. Further, the type of recovery instructions generated in act 240 may also depend on the type of failures being addressed. For example, a fuller set of instructions may be generated for a complete system reconstruction than for a restoration of only a few servers for a single distributed application.

The recovery instructions generated in act 240 may generally depend on the type of information that is collected in the data-gathering acts 205 and 220. The information included in the recovery instructions may include information about the configuration of the distributed system being protected. This information may include path information for working databases on the data servers, path information for backup databases, network topology information, manager interface data, certificate data, registry data, email distribution listings for administrators of disaster recovery operations, backup history, patch history, and others, and combinations thereof.

Figure 3:
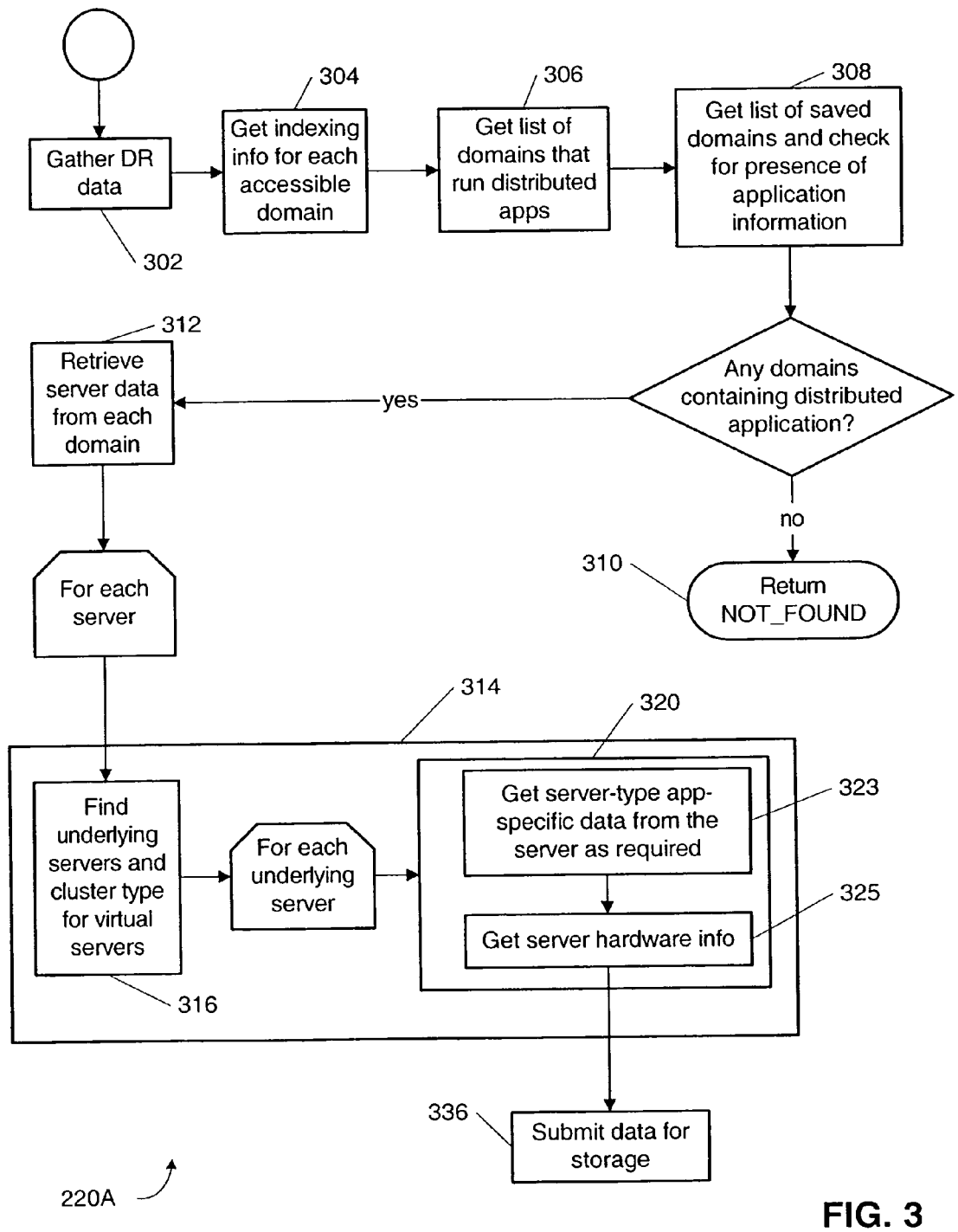
FIG. 3 is a flow diagram of one implementation of a procedure for gathering information.

FIG. 3 is a flow diagram of one implementation of a procedure 220A for gathering information. The procedure 220A may be useful for recovering a distributed application in the event of a disaster or other substantial system failure. For example, the procedure 220A may be used to carry out the act 220 from FIG. 2. The procedure 220A may commence in act 302 with the initiation of the information gathering. This initial act may use tools such as a resource discovery process or other software to obtain information about hardware and software configurations and application data on an individual server or on a distributed system. In act 304, the procedure 220A may use additional software tools or indexes to obtain information on domains that are accessible to the distributed application. The data collections may exist in a variety of formats, depending on the type of distributed application being addressed by the procedure 220A. For example, in the case of the Live Communication Server application (LCS), the act 304 may refer to an Active Directory® (AD) data set to identify the various domains used on the distributed system. The procedure may then examine the various data collected in act 306 to select only the domains that include servers running the distributed application—for example, the AD domains that include LCS entities. The data collections identified in acts 304 and 306 may be augmented with other domains. For example, the procedure may search through a listing of previously archived domains in act 308. This listing may identify additional domains that include servers running the distributed application.

If the acts 302-308 do not identify any domains with servers running the distributed application, the procedure 220A may terminate in act 310. Otherwise, the procedure may progress to examine the domains in act 312 to determine which servers run the distributed application. This act may include a block 314 of activities that is iterated for each server identified in act 312.

Each iteration in the block 314 may further seek sources of information. For example, the servers identified in the preceding acts 302-312 may include virtual servers. In such a situation, the procedure may discover, in act 316, the identities of underlying servers, cluster types, and other features of the virtual servers, so that this information can be gathered for use as recovery information. Further, these components of the virtual servers may in turn be examined for relevant information to be gathered. As illustrated in block 320, the procedure may also gather relevant information, such as indexing information and other application-specific information in act 323. In act 325, the procedure may also gather hardware information for each server identified in the act 316. The indexing information may include administrative control information, such as Windows Management Instrumentation (WMI) data for an LCS application, or other information specific to the distributed application being addressed in a data protection procedure. The hardware information may include component configuration information and other physical characteristics of a server.

The data collected in acts 302-325 may be stored in a centralized server, such as the DR server 170 or the off-site storage 175 from FIG. 1, or in local or distributed data collections, such as in one or more of the servers 110a-f or 140. As illustrated in act 336, the collected data may be stored in a data archiving database, such as a Veritas® Backup Exec® (BE) database.

Figure 4:
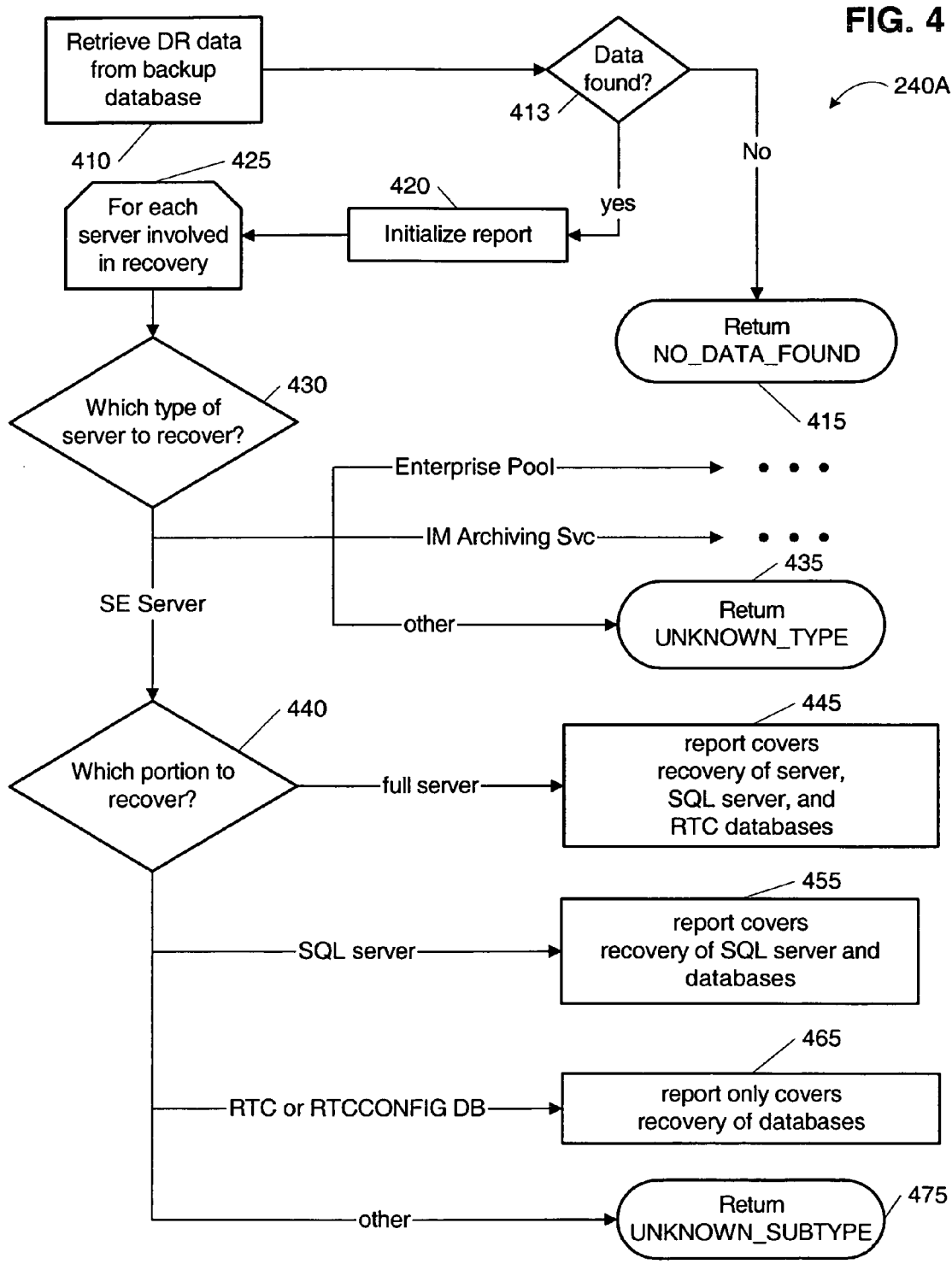
FIG. 4 is a flow diagram for one implementation of a procedure for generating a recovery report.

FIG. 4 is a flow diagram for one implementation of a procedure 240A for generating a recovery report. The procedure 240A may be used, for example, to carry out the act 240 from FIG. 2. The procedure 240A may use information previously gathered during the course of normal operations of a distributed system, such as the information gathered by the procedure 220A from FIG. 3. The procedure 240A may commence in act 410 by turning to a database to retrieve disaster-recovery data or other recovery information. The act 410 may be tailored to seek recovery information for one or more specific types of distributed applications, such as an LCS installation. In act 413, the procedure 240A may check whether any recovery information was found in the act 410; if not, the procedure may terminate in act 415 and return an appropriate message. Otherwise, the procedure may initialize a report in act 420. The report initialization may involve creating a file that may be printed out for use by an administrator or preparing to send a message via e-mail or other electronic distribution (such as text messaging or rich site summary (RSS) feeds) to appropriate recipients. In other embodiments, the report initialization may instead (or in addition) involve creating a machine-executable script for performing portions of an automated recovery or an entire automated recovery.

As indicated by block 425, the procedure 240A may iterate a series of recovery activities for each server that is involved in the recovery. The procedure 240A may include a series of tests based on the type of recovery being performed. The type of report generated may then be tailored according to the type of recovery being performed. In the implementation illustrated in FIG. 4, for example, the procedure includes two branch points 430 and 440 regarding the type of server being recovered and the extent of the recovery being performed. The procedure then creates different types of reports based on the type of server being recovered or the extent of the recovery being performed. The branch points 430 and 440 may be decided by a user input, or by an automated recovery decision based on the on the type of failure that is being recovered, or by limitations in the available restoration information.

In branch point 430, the procedure 240A ascertains the type of server being recovered. In the illustrated example, the procedure 240A is equipped for the recovery of Enterprise Pool, IM Archiving Services, and Microsoft® Standard Edition (SE) Server.

If the server being addressed is an SE Server, then the procedure may next check additional aspects of the recovery being performed in branch point 440. If the recovery is for an entire server, then the procedure 240A may generate a report in act 445 that covers several recovery operations: a recovery of the server, a recovery of a server application deployed on the server, and the recovery of databases maintained by the server. One example of a server application is Microsoft® SQL Server 2000 Desktop Engine (MSDE). Examples of databases maintained by the server include "real time collaboration" (RTC) databases that may be continuously updated during operation of the server. Such databases may include information that may be needed for proper operation of the server application, such as identifying information on the servers in use by the application, indications of whether archiving is needed for various data sets, rules that may be suggested to users, and information on users, among others.

If the recovery addresses only a deployment of a server application, such as an instance of MSDE or other Structured Query Language (SQL) server or other database servers, then from the branch point 440 the procedure may generate a report in act 455 that covers only a recovery of a server application deployed on the server and the recovery of databases maintained by the server. This report may include information regarding the location of backup copies of the databases from the server, as well as data that makes the database usable.

If the recovery addresses only various databases, for example, RTC databases or RTC configuration databases, then following the branch point 440 an appropriate report is generated in act 465 that covers the recovery of those databases. Otherwise, the procedure may terminate in act 475 while returning an appropriate error message.

Instead of addressing an SE server, the procedure 240A may be employed to perform recovery on other types of servers, such as for example, a front-end server or IM Archiving Services server. Following branch point 430, the procedure 240A may take appropriate measures tailored to the recovery of such servers (not shown). If the server being addressed by the procedure 240A is of an unknown type, then the branch point 430 may lead to a termination of the procedure in act 435 while returning an appropriate error message.

Figure 5:
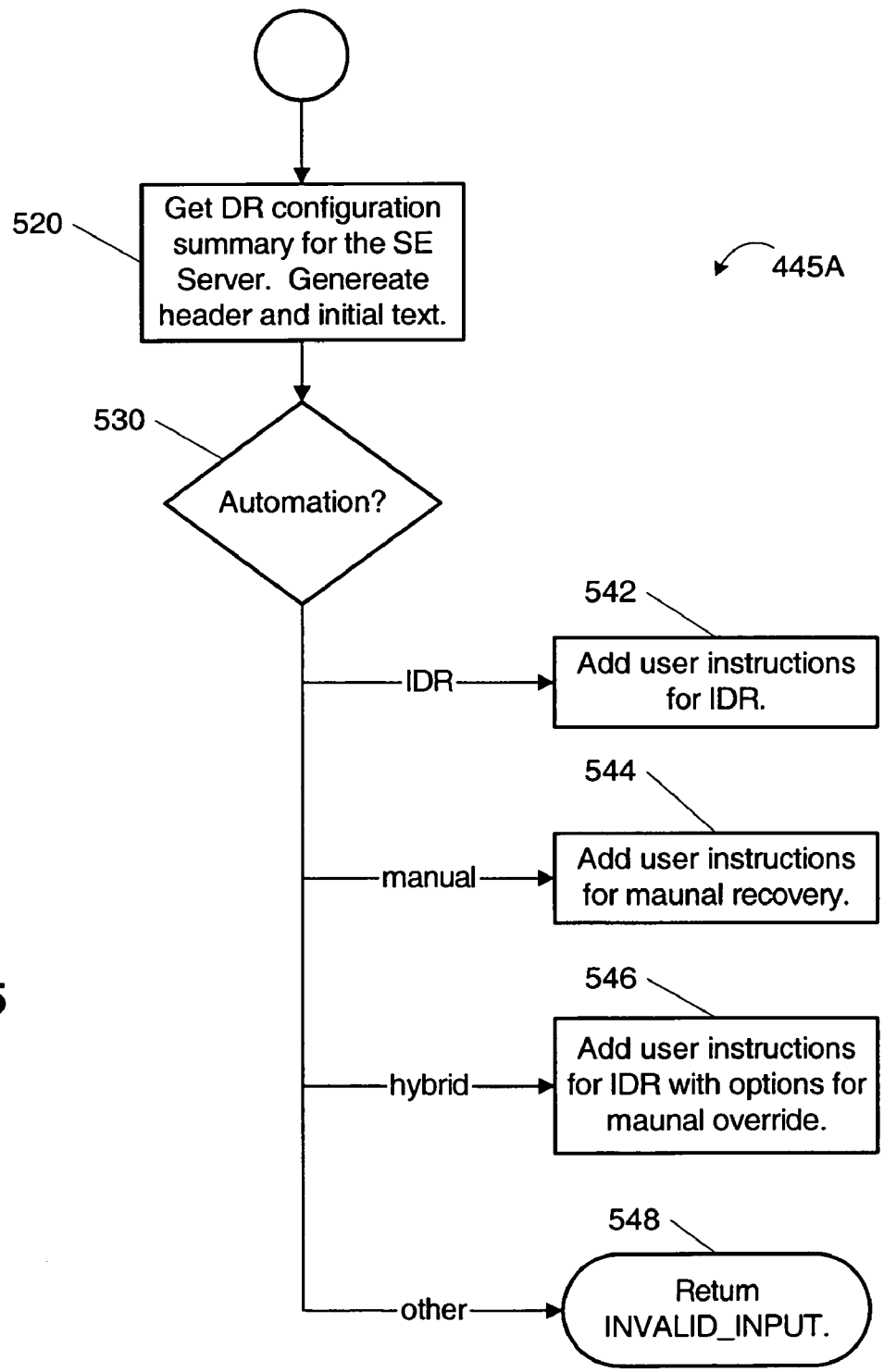
FIG. 5 is a flow diagram of one implementation of a procedure for creating a server recovery report.
Figure 6:
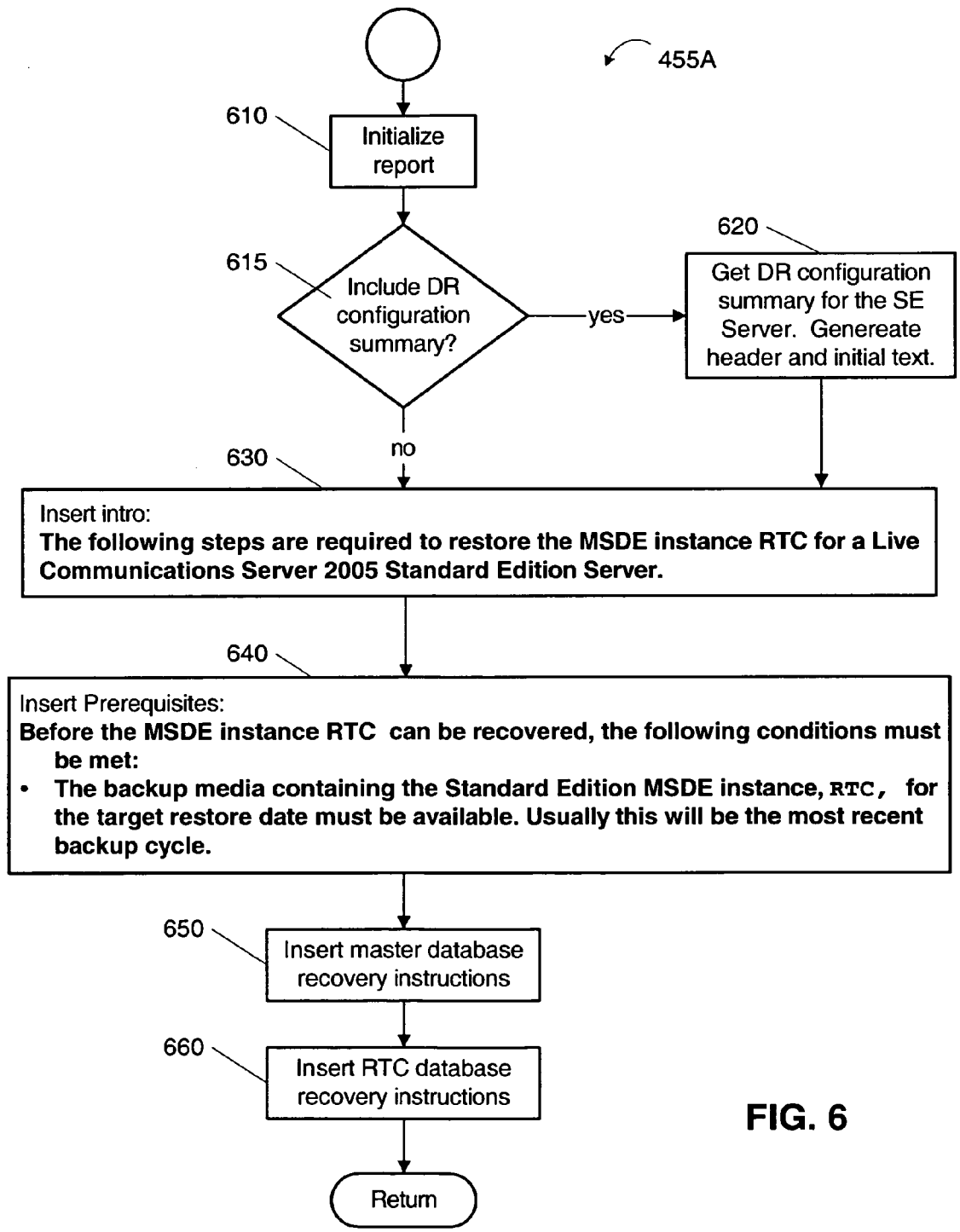
FIG. 6 is a flow diagram of one implementation of a procedure for creating a recovery report for a database server instance.
Figure 7:
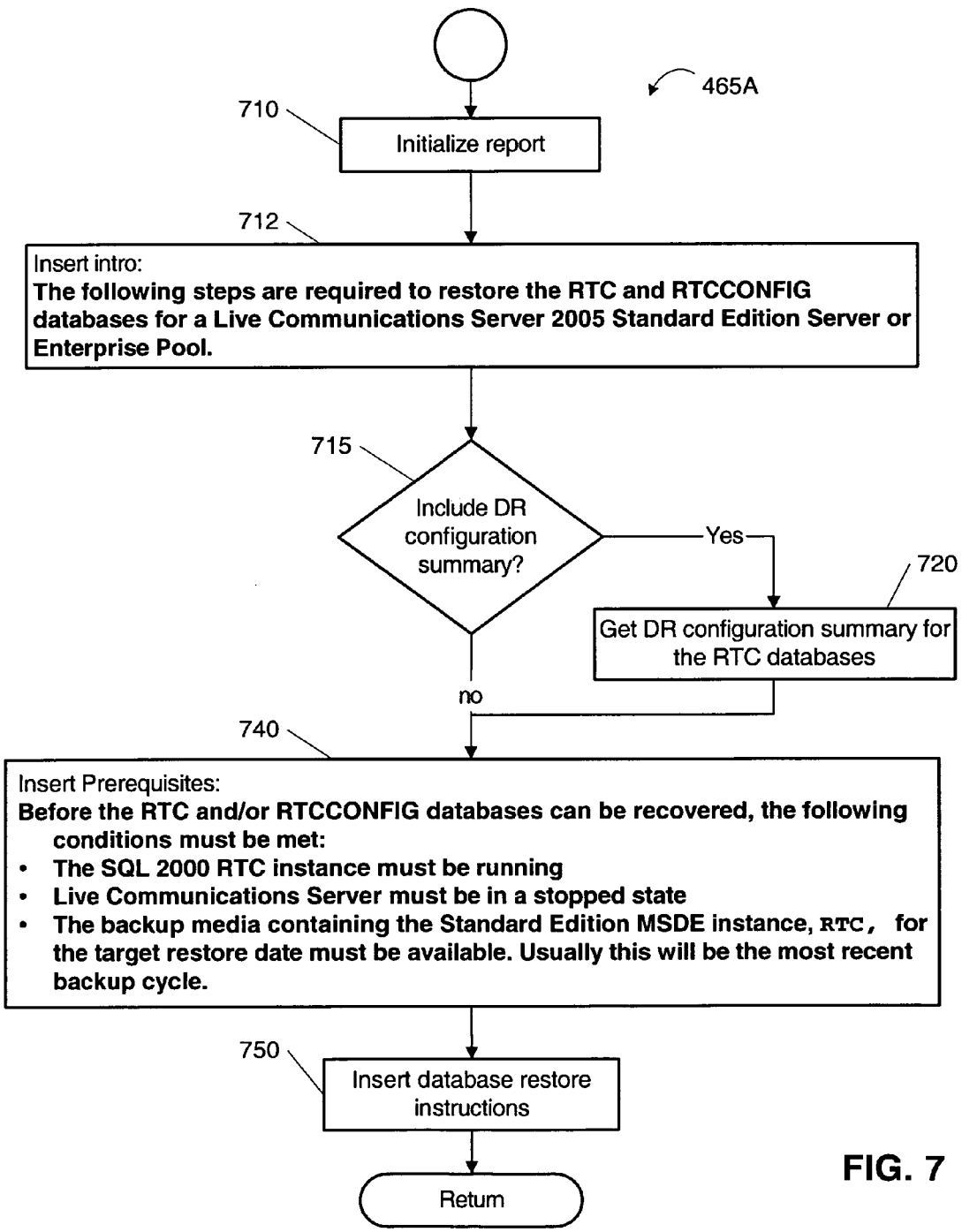
FIG. 7 is a flow diagram of one implementation of a procedure for creating a database recovery report.

The acts 445, 455, and 465 in the procedure 240A may each include measures for creating appropriate reports. FIGS. 5, 6, and 7 present illustrative examples for implementing the acts 445, 455, and 465, respectively.

FIG. 5 is a flow diagram of one implementation of a procedure 445A for creating a server recovery report. The procedure 445A may be used, for example, to implement act 445 in FIG. 4. The procedure 445A may commence in act 520 by preparing a configuration summary for the server to be recovered. This act may include preparing header information and initial text for the report. The procedure 445A may be configured to support both manual recovery procedures and automated recovery procedures. A branch point 530 in the procedure may determine if the report being generated is to be used for a manual recovery or an automated recovery, or some combination thereof. For example, this decision may be based on an input made by a system administrator. In the illustrated example, the acceptable options lead to subsequent steps for an automated or "intelligent" disaster recovery (IDR) 542, or a manual recovery 544, or a hybrid recovery—an IDR with step-by-step prompting for manual overrides 546. The procedure may return an appropriate error message 548 if none of the available options is selected.

The act 542 of preparing a report for an automated recovery may include generating a printable document with instructions for an administrator to initiate an automated recovery process. For example, the automated recovery report may be specifically implemented for the recovery of an SE server, and may generate a printed (or electronic) document for such a recovery. The report may include an introduction, prerequisite information, and guiding details. An example of such information is presented in Appendix 1 for the recovery of a Standard Edition server.

FIG. 6 is a flow diagram of one implementation of a procedure 455A for creating a recovery report for a database server instance. The procedure may be organized so that the recovery instructions are prioritized according to inter-relationships and dependencies in the information included in the report. The procedure 455A may be used, for example, to implement act 455 in FIG. 4. Depending on the particular configuration, the procedure 455A may be used for a various types of server applications. In the illustrated example, the procedure 455A is configured to support the recovery of an instance of MSDE onto a server.

The procedure 455A may commence in act 610 with the initialization of a user-readable or machine-readable report. A decision 615 may then be made whether to include a configuration summary so that the report may be used as a part of a disaster-recovery effort. The decision 615 may be based upon a user input. Alternatively, the decision 615 may be based upon an automated sensing of a server status that determines whether an extensive recovery may be warranted for the server on which the application is being recovered. If a configuration summary is not needed, the procedure 455A turns to act 630. If a configuration summary is to be included, the procedure may prepare a disaster-recovery configuration summary for the server in act 620 prior to turning to act 630.

In act 630, the procedure 455A may insert introductory text into the report. The procedure may also insert information on prerequisites for the recovery in act 640. The procedure may then include recovery instructions for a master database supporting the server application in act 650. Appendix 2 includes an example instructions that act 650 may include in a hard-copy report for an administrator overseeing the recovery of a master database for a MSDE instance.

In act 660, the procedure 455A may include recovery instructions for auxiliary databases, for example RTC databases, in the recovery report. An example of such recovery instructions is presented in FIG. 7.

FIG. 7 is a flow diagram of one implementation of a procedure 465A for creating a database recovery report. The procedure 465A may be used, for example, to implement the act 465 in FIG. 4. The procedure 465A may similarly be used to implement the act 660 in FIG. 6.

The procedure 465A may commence in act 710 with the initialization of a user-readable or machine-readable report. In act 712, the procedure may include a user-readable introductory message in the report. A decision 715 may then be made whether to include a configuration summary so that the report may be used as a part of a disaster-recovery effort. The decision 715 may be based upon a user input. Alternatively, the decision 715 may be based upon an automated sensing of a server status that determines whether an extensive recovery may be warranted for the server on which the application is being recovered. If a configuration summary is not needed, the procedure 465A turns to act 740. If a configuration summary is to be included, the procedure may prepare a disaster-recovery configuration summary for the server in act 720 prior to turning to act 740.

In act 740, the procedure 465A may describe prerequisites for the recovery in act 740. The procedure may then include recovery instructions for one or more databases in act 750. Appendix 3 includes an example instructions that act 750 may include in a hard-copy report for an administrator overseeing the recovery of one or more databases.

Figure 8:
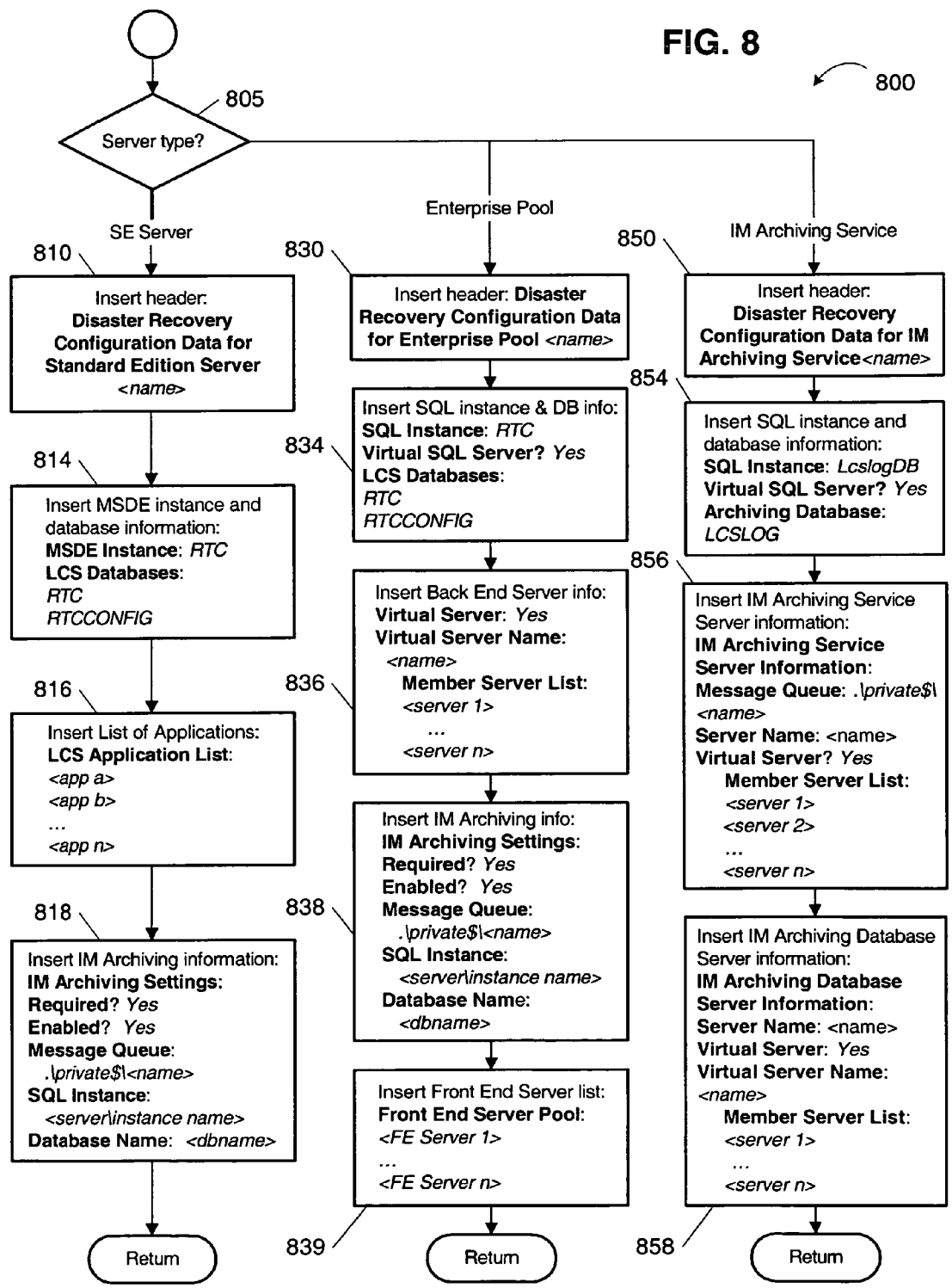
FIG. 8 is a flow diagram illustrating one implementation of a procedure for preparing a configuration summary.

FIG. 8 is a flow diagram illustrating one implementation of a procedure 800 for preparing a configuration summary. The procedure 800 may be used, for example, to carry out the act 520 from FIG. 5, the act 620 from FIG. 6, or the act 720 from FIG. 7.

The procedure 800 illustrates various types of information that may be collected into a single report for the benefit of an administrator overseeing an extensive recovery of a distributed application. In the illustrated example, the procedure 800 is configured to provide relevant recovery information for any one of three different types of distributed applications used in an LCS installation: an SE Server, an Enterprise Pool, or an IM Archiving Service. The relevant information may have been gathered during normal operations of the applications, such as using the procedure 220 from FIG. 3.

The procedure 800 may commence in a branch point 805 that selects appropriate activities based upon the type of server being recovered, similar to the branch point 430 from FIG. 4. In the illustrated example, the procedure 800 is equipped for the recovery of Enterprise Pool, IM Archiving Services, and SE Server.

If the server being addressed is an SE Server, then the procedure 800 may advance from the branch point 805 to the act 810. The act 810 may insert header information identifying the subsequent configuration information as being relevant to an SE server, and may indicate the name of the server being recovered.

In act 814, the procedure may then include information on databases running on the server being restored, such as the name of an MSDE instance and the names of databases used by the MSDE instance. In act 816, the procedure may include a list of individual applications that use the databases. In act 818, the procedure may also include configuration information for instant messaging archives that support the SE server.

If the server being addressed is an Enterprise Pool server, then the procedure 800 may advance from the branch point 805 to the act 830. The act 830 may insert header information identifying the subsequent configuration information as being relevant to an Enterprise Pool server, and may indicate the name of the server being recovered.

In act 834, the procedure may then include information on databases running on the server being restored, such as the name of a SQL instance and the names of databases used by the SQL instance. In act 836, the procedure may include a list of back-end servers that support the Enterprise Pool. The list in act 836 may include one or more virtual servers, each of which may include one or more physical servers (or portions thereof). In act 838, the procedure may also include configuration information for instant messaging archives that support the Enterprise Pool. In act 839, the procedure may include a list of front-end servers that support the Enterprise Pool.

If the server being addressed is an IM Archiving Server, then the procedure 800 may advance from the branch point 805 to the act 850. The act 850 may insert header information identifying the subsequent configuration information as being relevant to an IM Archiving Server, and may indicate the name of the server being recovered.

In act 854, the procedure may then include information on databases running on the server being restored, such as the name of a SQL instance and the names of databases used by the SQL instance. In act 856, the procedure may include configuration information for instant messaging archives that support the IM Archiving Server, including the name of the IM archive server and (if the server is a virtual server) underlying physical servers. In act 858, the procedure may include a list of database servers that support the IM Archiving database.

FIGS. 3-8 include procedures by which a system protection tool may gather configuration information during normal operation of a distributed application, and when needed, may present the configuration information in a report to assist in system restoration procedures. The illustrated examples may be useful for an LCS service or other application deployed in a distributed set of servers. It will be appreciated that these procedures may be augmented and adapted as needed to support the restoration of other types of services and applications running in a distributed environment.

A system protection tool may be equipped with interfaces and components that allow a system administrator to prepare a customized data-collection scheme and a customized data-reporting scheme to support a particular type of distributed application. The customized data-collection and data-reporting schemes may then operate to carry out the procedure 200 from FIG. 2 for a particular application managed by the system administrator.

The system protection tool may be a stand-alone application, or may be incorporated into other data-protection software such as, for example, Backup Exec. To assist an administrator in preparing customized data-collection and data-reporting schemes, the system protection tool may be equipped with a variety of components.

One such component may be a user-interface (UI) view of the application at job setup time, job monitoring time, and restoration time. This UI would recognize distributed applications, and would group objects belonging to the application in its displays. For example, in a job setup window, an administrator may select an action such as "Create Distributed Application Job," or "Modify Distributed Application Job." If one of these options is selected, a Backup Job Properties window could then be tailored to meet the needs of the distributed application. For example, in the generalized case, an administrator using the system protection tool may be able to view an application server group, add or remove machines from the group, define server types, and create server-type specific selection lists, templates and policies and apply them to sub-groups of application servers. A Job Monitor window may group jobs that belong to a distributed application. A Restore window may display a list of servers that are members of a distributed application, grouped by server type.

Once an administrator has used the UI to define a customized data-collection and data-reporting scheme, the system protection tool may allow this definition to be saved and ported to other installations, so that the administrator may avoid duplicating the definition process. Similarly, customized definitions of data-collection and data-reporting schemes may be made available to administrators in a pre-packaged form.

Another component of the system protection tool may be an interface for defining selection lists and policy definitions for various server types. Different types of servers may have different backup requirements. An administrator may not wish to do full backups of a group of servers that are not individually mission-critical. Instead, it may be adequate in various circumstances to do a daily back up of only the application-specific data on these servers, and to recover these data to a fresh machine if one fails. Conversely, for a back-end database server, where quick recovery is important, preparations for an intelligent disaster recovery, regular full database backups, and regular database log backups throughout the day might be the choice of the administrator. Thus, each server type may require a specific selection list. The system protection tool may include an interface for defining selection lists and policy definitions to assist an administrator in preparing the appropriate lists and policies.

Further, the system protection tool may be equipped with a component that provides application-specific alerts and reports. Similarly, the system protection tool may also include an email distribution list so that appropriate reports may be transmitted to administrators who would be involved with restoration procedures in the event of a disaster. A backup administrator responsible for a distributed environment may set up an email distribution list for backup job notifications, so that other administrators in other locations can be alerted to (or reminded of) the need to perform a local backup procedure.

An application-specific disaster-recovery report may be generated and mailed to the distribution list on a periodic basis. Thus, the report may be immediately accessible at various locations in the event that a recovery is needed. The report may contain, for example, a list of the servers, grouped by type, information about hardware configuration, information about what data is being stored for each server (e.g., storage configuration characteristics such as lists of volumes, lists of disks, path information, and disk and volume sizes; processor characteristics; and bus characteristics; among others), recent backup job status information, backup set information, and similar information. Recovery instructions may also be included in this report.

Yet another component of the system protection tool may be a functionality to create and/or maintain a clone of various types of servers. Distributed applications often utilize sets of similar servers that run some portion of the distributed application, but are not individually mission critical. Each server of this type may contain only a small amount of configuration and application data that distinguishes it from other servers of its type. For such a server, it may be helpful to perform regularly back ups only of application-related data and data that identifies the server. For example, this limited back-up procedure may shorten the overall time required to complete nightly backups, and may save space on backup media. (Saving and restoring identity data may be helpful to avoid the need to remove and re-add a restored server in a central directory, such as Active Directory, which may result in the loss of application-specific data for the server in the central directory.)

To enable quick restoration of this type of server, one member of the server-type set may be designated as a master, and may be scheduled for regular complete back-ups. In the event that a server in the set fails and needs to be restored, the back-up of the master may then be used to restore the failed server, after which the failed server's identity and application data would be applied to complete the restoration. This approach may provide an advantage in that the restored server may be up-to-date in terms of patches and upgrades, as opposed to the case where a static saved server becomes progressively more out-of-date over time.

For example, an LCS front-end server may hold some registry and WMI data, a certificate database, and a small MSDE database that is regularly synchronized with Active Directory. The server's Active Directory entry may link to a server pool to which the server belongs. LCS may provide a utility to extract the registry and WMI data for backup and restoration. This registry and WMI data, along with a MSDE database and a certificate database, may be sufficient data for performing a backup of a front-end server. With this server-specific data, and access to a master backup, the front-end server may be readily restored in the event of a failure.

Still further, another component of the system protection tool may be an ability to monitor for changes in an application server set. It has been observed that various issues with distributed applications arise when servers are added or removed from the group. In many environments, when a server is added, a backup administrator must remember to add it to the distributed application's backup job. When a server is removed, it generally does not need to be backed up any longer. The system protection tool may be equipped to monitor user-specified data repository records to check against the server set, or have a thread that checks for certain application-related messages. If changes are found, a notification may be sent to an email distribution list to remind appropriate administrators to update the distributed application's backup job. The system protection tool may also be configured to further automate this activity: the tool may automatically configure new servers for backup. This feature may require an ability to identify a group to which the new servers belong, and an ability to identify the types of the new servers.

Figure 9:
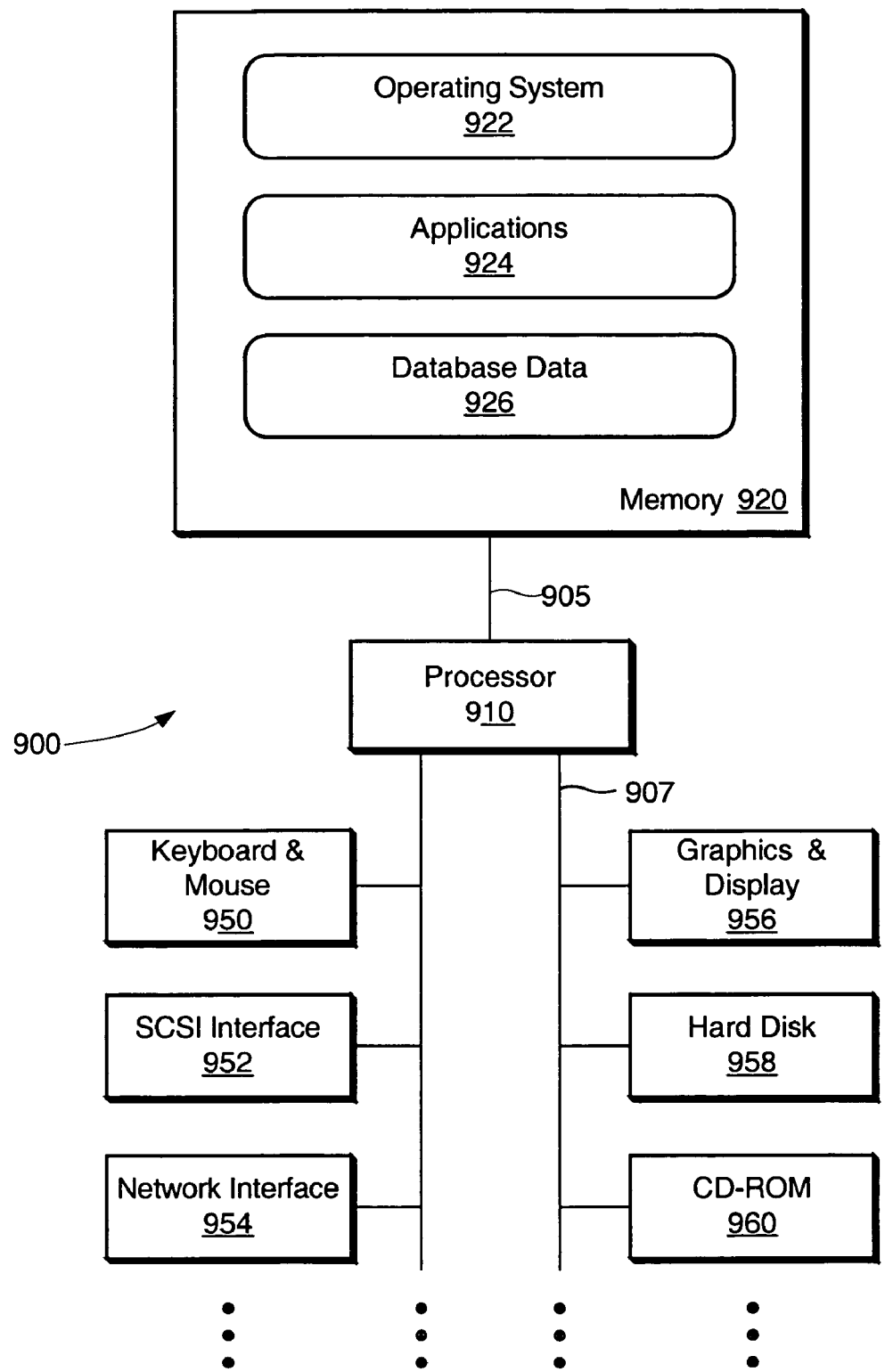
FIG. 9 is a block diagram of one embodiment of a computer system for implementing the techniques of the present invention.

FIG. 9 is a block diagram of one embodiment of a computer system for implementing the techniques of the present invention. FIG. 9 illustrates a computer system 900 configured to implement the techniques described herein. For example, computer system 900 may be an embodiment of one of the previously described servers 110a-f, 140, or 170. Computer system 900 may include a processor 910 and a memory 920 coupled together by a communications bus 905. Processor 910 may be a single processor or a number of individual processors working together. Memory 920 is typically random access memory (RAM), or some other dynamic storage device, and is capable of storing instructions to be executed by the processor, e.g., operating system 922, applications 924, and database data 926. The applications 924 may include distributed applications (deployed across more than one server), single-host applications, database server applications, data backup applications, data protection systems for distributed applications, collection modules, recovery modules, user interfaces, electronic notification tools, and others. Memory 920 may also be used for storing temporary variables or other intermediate information during the execution of instructions by the processor 910.

Computer system 900 may also include devices such as a keyboard & mouse 950, a SCSI interface 952, a network interface 954, a graphics & display 956, a hard disk 958, and a CD-ROM 960, all of which are coupled to processor 910 by communications bus 907. It will be apparent to those having ordinary skill in the art that computer system 900 may also include numerous elements not shown in the figure, such as additional storage devices, communications devices, input devices, and output devices, as illustrated by the ellipsis shown.

The flow charts of FIGS. 2-8 illustrate some of the many operational examples of the techniques disclosed in the present application. Those having ordinary skill in the art will readily recognize that certain steps or operations illustrated in FIGS. 2-8 may be eliminated or taken in an alternate order. Moreover, the methods described in FIGS. 2-8 are typically implemented as one or more software programs for a computer system and are encoded in a computer readable medium as instructions executable on one or more processors. The computer readable medium may include an electronic storage medium, a magnetic storage medium, or an optical storage medium, or combinations thereof. The software programs may also be carried in a communications medium conveying signals encoding the instructions. Separate instances of these programs may be executed on separate computer systems in keeping with the multi-process methods described above.

Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above may be utilized with a variety of different storage devices and computing systems with variations in, for example, the number of servers and the types of operation of the computing system, e.g., various forms of distributed applications and backup operations.

Those having ordinary skill in the art will readily recognize that the techniques and methods discussed below may be implemented in software using a variety of computer languages, including, for example, traditional computer languages such as assembly language, Pascal, and C; object oriented languages such as C++, C#, and Java; and scripting languages such as Perl and Tcl/Tk. Additionally, software 924 may be provided to the computer system via a variety of computer readable media including electronic media (e.g., flash memory), magnetic storage media (e.g., hard disk 958, a floppy disk, etc.), optical storage media (e.g., CD-ROM 960), and communications media conveying signals encoding the instructions (e.g., via a network coupled to network interface 954).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

APPENDIX 1

Introduction-SE Server IDR Recovery

This section describes the steps required to use IDR to recover a Standard Edition server or server cluster for which you've initialized DR and performed regular system backups.

Prerequisites

Required components:

1. Boot CD created by Archive Software
2. DR recovery diskette from Archive Software
3. Media with data from the most recent complete system backup Administrator Guide 1. Review the IDR chapter in the Archive Software manual.
2. If you earlier created a CD (or DVD) containing a bootable IDR recovery image for the server, you now need to create the IDR recovery diskette for the server, unless you created an updated set following the server's last full backup. If you haven't yet created a CD containing a bootable DR recovery image, you can create one now, and in this case, you won't also need to create the recovery diskette. To create a bootable IDR recovery image at this point, the server's most recent backup set must include a full traditional backup of the Standard Edition MSDE RTC instance, full backups of all disk volumes to which data must be restored, with no data excluded from the backup, and backups of disk utility partitions.
3. After the required media described in the previous step has been assembled, use the DR boot CD to boot the machine that will be the new Standard Edition server. You may have to change the SCSI BIOS settings of the machine to enable booting from the CD-ROM.

4. Read the instructions displayed on the screen. Then, press ENTER to perform the recovery or press ESC to abort. The machine will boot from the CD. Very shortly after the boot process begins you will be requested to:
   a. Press F6 if the server being recovered requires OEM-specific, third party SCSI or RAID drivers. Do this if required.
   b. Press F2 to select automatic system recovery. This is required for the IDR system recovery to proceed.

5. At this point, you will be asked to confirm the disks to be formatted for the recovery. The volumes will be formatted and operating system file will be copied to the new system volume. The system will automatically restart when the copy completes, and will continue the operating system installation process.

6. After the Windows installer finishes the network installation, the Archive Software wizard appears. In the first screen, you will be asked to place the DR recovery diskette into floppy drive A: When you have done so, press NEXT to continue.

7. The next screen is titled Choose the Level of Wizard Assistance. Automated recovery is best, and Restoring to the exact same system should be checked if the restore is to the same physical machine, or a machine with the same disk configuration. If restoring to a differently configured machine, a wizard will guide you through the steps necessary to apply the backup to the new machine. When you've made your selection, click Next.

8. The next screen is titled Select Recovery File, and contains a list of one or more recovery files from the DR recovery diskette. Select the appropriate .dr configuration file, and click Next.

9. In the next screen, titled Modify Hard Disk Layout, you have an opportunity to make additional changes to your hard disk layout. At this point, the IDR process should have created all of the volumes that were included in your initial IDR backup. If the configuration is incorrect or incomplete, click Run Disk Management and make the changes using the Logical Disk Manager. When you are satisfied with the disk configuration, click Next.

10. In the next screen, titled Select Restore Method, if the backup device you want to restore from is attached locally, select Use locally attached media device. If you have a remote media server that has the backup device and media you need to use for recovery, select Install networking and restore from a remote media server. If you are restoring from a remote Backup Exec media server:
    a. Enter in the appropriate connectivity information to establish a connection to the remote media server.
    b. If your server requires a static IP address, set it up at this time by clicking on View Network Connections. In the Network Connections popup window, select the network adapter you need to configure, and click Properties. The adapter's Connection Properties window appears. When you have finished setting the adapter's properties, click Close to return to the Network Connections screen. Then click OK to return to the Connect to Media Server screen.
    c. Click Next to connect to the media server.

11. The Restore Data screen appears. Review the media sets that will be used in the restore, and then click Next.

12. A screen titled Restoring Data appears. It contains status information about the progress of the restore effort. You can also monitor the restore from the Backup Exec Administrator display on the media server.

13. Once the restore process is completed, a message box labeled Automated Process Complete appears, indicating that the automatic portion of the recovery is completed. Unless you want to restore additional media sets, click No.

14. The process is complete, and a screen titled "You have completed the Disaster Recovery Wizard" appears. Remove the IDR boot CD and IDR recovery diskette from the newly-recovered machine, and click Finish. The system will reboot automatically.

15. After the Standard Edition server reboots, log on to the server and verify the presence of the volumes that will contain logs and databases for the Standard Edition MSDE instance, RTC. If the volumes were not created during the IDR restore, use the Disk Management program to create them.

APPENDIX 2

Master Database Recovery

The first task in recovering the MSDE instance RTC is to recover its master database, using the Backup Exec SQL Server agent. This requires the MSDE instance's service, MSSQL$RTC, to be running. If you are doing a disaster recovery of the Standard Edition server, you will have already restored the file system of the volume containing the MSDE instance's databases, but the databases are not yet in a usable form unless you performed an IDR restore. If you performed an IDR restore, you can skip steps 1-4 below. If you did not perform an IDR restore, you must do the following manual steps on the Standard Edition server to start the MSSQL$RTC service before proceeding with master database recovery:

1. Locate the directory where the instance's master and model databases are stored. By default, the location is C:\Program Files\Microsoft SQL Server\MSSQL$RTC\data.

2. To facilitate starting the service, Backup Exec restores renamed copies of the master and model databases and log files. These files must be renamed as follows:
   Rename Master$4IDR to master.mdf
   Rename mastlog$4IDR to mastlog.idf
   Rename Model$4IDR to model.mdf
   Rename modellog$4IDR to modellog.ldf 3. After the rename is complete, make sure none of the files are read-only, or the MSSQL$RTC service will not start.

4. Restart the MSSQL$RTC service from the Microsoft Services utility.

Once MSSQL$RTC is running, you can proceed with restoring the current version of the master database, and when that is done, the instance's remaining databases.

Steps:

1. On the Standard Edition server, verify that the Live Communications Server service is stopped, and the MSSQL$RTC service is running.

2. Return to the Backup Exec 10.0 administration application on the Backup Exec media server.

To restore the master database:
   a. Select Restore from the navigation bar.
   b. Locate and expand the Standard Edition server in the selection tree.
   c. Select the Microsoft SQL Server RTC, and the media sets available for a restore appears. Click the latest good backup set, and its set of databases appears to the right of the selection tree.
   d. Select master in the right pane.
   e. In the Properties pane on the left, under Settings, select Microsoft SQL.
   f. A Restore Job Properties window appears. In the right pane, check Automate master database restore.
   g. Click Guide Me . . . in the lower right corner of the window.

i. A wizard called the Guide for SQL Server Restore appears. In the first screen, titled Welcome, read the introductory text, and click Next.
ii. In the next screen, titled Restoring Database Files, select Yes, replace existing databases and No, restore the database files to their original locations. Click Next.
iii. In the next screen, titled Restoring Transaction Logs, select Yes, restore the entire transaction log to the database, and click Next.
iv. In the next screen, titled Taking the Database Offline, select No, leave the database in its current state, and click Next. Because the Live Communications Server service is stopped, there should be no possibility of active connections.
v. In the next screen, labeled Bringing the Database Online, select Yes, this is the last backup set that will be restored, and click Next.
vi. In the next screen, labeled Consistency Check for Restore, make a selection for a post-restore consistency check, and click Next.
vii. The next screen, titled Summary, summarizes the restore steps that will be performed. Click Finish if satisfied, or Back to change restore options.
h. Back at the Restore Job Properties window, click Run Now.
i. If a Job Summary window appears, click OK.
j. A popup window notifying you that the job has been submitted might appear. If so, click OK.
3. Monitor the progress and final status of the restore job in the Job Monitor window.
4. After the restore job has completed, return to the Standard Edition server, and verify that the MSSQL$RTC service is running.

APPENDIX 3

RTC Database Restoration Instructions

1. On the Standard Edition server, verify that the Live Communications Server service is stopped, to avoid the possibility of any other connections to the server's MSDE instance.
2. On the Backup Exec media server, launch the Backup Exec 10.0 Administration application, and begin the restore:
    a. Select Restore from the navigation bar.
    b. Locate and expand the Standard Edition server in the selection tree.
    c. Select the Microsoft SQL Server RTC, and the media sets available for a restore appear. Click the latest good backup set, and its set of databases appears to the right of the selection tree.
    d. In the right pane, select each database to be restored.
    e. In the Properties pane on the left, under Settings, select Microsoft SQL.
    f. A Restore Job Properties window will appear. Click Guide Me . . . in the lower right corner of the window.
        i. A wizard called the Guide for SQL Server Restore appears. In the first screen, titled Welcome, read the introductory text, and click Next.
        ii. In the next screen, titled Restoring Database Files, select Yes, replace existing databases and No, restore the database files to their original locations. Click Next.
        iii. In the next screen, titled Restoring Transaction Logs, select Yes, restore the entire transaction log to the database, and click Next.
        iv. In the next screen, titled Taking the Database Offline, select No, leave the database in its current state, and click Next. Because the Live Communications Server service is stopped, there should be no possibility of active connections.
        v. In the next screen, labeled Bringing the Database Online, select Yes, this is the last backup set that will be restored, and click Next.
        vi. In the next screen, labeled Consistency Check for Restore, make a selection for a post-restore consistency check, and click Next.
        vii. The next screen, titled Summary, summarizes the restore steps that will be performed. Click Finish if satisfied, or Back to change restore options.
3. Back at the Restore Job Properties window, click Run Now.
4. If a Job Summary window appears, review it and click OK.
5. A popup window notifying you that the job has been submitted might appear. If so, click OK.
6. Monitor the progress and final status of the restore job in the Job Monitor window.

After the restore job has completed, restore user access to the database. Start the Live Communications Server service, via the Services application or from the Live Communications Server 2005 Management application.

What is claimed is:

1. A method comprising:
    automatically gathering, using one or more processors, configuration information regarding a plurality of servers, where
        the configuration information comprises information regarding data archived from the servers, and
        the configuration information comprises information for restoring the archived data onto one or more of the plurality of servers;
    storing the configuration information in at least one computer readable medium;
    assembling recovery instructions, where
        the recovery instructions are based at least in part on the automatically gathered configuration information,
        the recovery instructions are usable for restoring the servers and for restoring the archived data, and
        the assembling comprises:
            determining whether the recovery instructions are to be used for an automated recovery, and
            if the recovery instructions are not to be used for an automated recovery, generating a list of user instructions for recovery, where the list of user instructions is based at least in part on the automatically gathered configuration information; and
    storing the recovery instructions on one or more computer-readable storage media.

2. The method of claim 1, where the gathering comprises discovering locations of the configuration information in a distributed system.

3. The method of claim 1, where the servers execute a distributed application and the recovery instructions are usable for restoring the distributed application.

4. The method of claim 1, where the gathering comprises:
    monitoring the servers for data backup jobs; and
    gathering the configuration information in response to the data backup jobs.

5. The method of claim 1, where the gathering comprises discovering locations of the configuration information and the gathering is performed by a centralized disaster-recovery server.

6. The method of claim 1, where the assembling comprises assembling tailored user-readable recovery instructions in response to limitations in the configuration information.

7. The method of claim 1, where the gathering comprises selecting configuration information necessary for restoration of one or more of the servers.

8. The method of claim 1, where the assembling comprises assembling tailored recovery instructions in response to types of information comprised in the configuration information.

9. The method of claim 1, where the configuration information comprises at least one of:
   information regarding the structure of original data stored on the servers;
   information regarding hardware configuration of the servers; or
   user-selected parameters for applications on the servers.

10. The method of claim 1, where the assembling comprises generating an automated script.

11. A system comprising:
    a collection module comprising a processor and configured to gather configuration information regarding a plurality of servers, where the configuration information comprises information regarding data archived from the servers and information for restoring the archived data; and
    a recovery report generation module configured to:
        determining whether recovery instructions are to be used for an automated recovery, and
        assemble the recovery instructions based at least in part on the gathered configuration information, where the recovery instructions are usable for restoring the servers, and
        if the recovery instructions are not to be used for an automated recovery, generate a list of user instructions for recovery, where the list of user instructions is based at least in part on the gathered configuration information.

12. The system of claim 11, where the collection module is configured to discover locations of the configuration information in a distributed system.

13. The system of claim 11, where the servers execute a distributed application and the recovery instructions are usable for restoring the distributed application.

14. The system of claim 11, where the collection module is further configured to monitor the servers for data backup jobs, and to gather the configuration information in response to the data backup jobs.

15. The system of claim 11, where the collection module is further configured to discover locations of the configuration information.

16. The system of claim 11, where the configuration information comprises at least one of:
    information regarding the structure of original data stored on the servers;
    information regarding hardware configuration of the servers; or
    user-selected parameters for applications on the servers.

17. A system comprising:
    means for gathering configuration information regarding a plurality of servers, where the configuration information comprises information regarding data archived from the servers and information for restoring the archived data; and
    means for generating a recovery report, where the means for generating a recovery report comprises a processor configured to:
        determine whether the recovery report is to be used for an automated recovery, and
        assemble recovery instructions based at least in part on the gathered configuration information, where the recovery instructions are usable for restoring the servers, and
        if the recovery instructions are not to be used for an automated recovery, generate a list of user instructions for recovery, where the list of user instructions is based at least in part on the gathered configuration information.

18. The system of claim 17, where:
    the means for gathering the configuration information is configured to discover locations of the configuration information in a distributed system; and
    the servers execute a distributed application and the recovery instructions are usable for restoring the distributed application.

19. The system of claim 17, where the means for gathering the configuration information is configured to monitor the servers for data backup jobs, and to gather the configuration information in response to the data backup jobs.

20. A computer readable storage medium comprising program instructions executable on one or more processor, the computer readable medium being at least one of an electronic storage medium, a magnetic storage medium, or an optical storage medium, where the program instructions are executable by the processor to implement each of:
    automatically gathering configuration information regarding a plurality of servers, where the configuration information comprises information regarding data archived from the servers and information for restoring the archived data; and
    assembling recovery instructions based at least in part on the automatically gathered configuration information, where the recovery instructions are usable for restoring the servers and for restoring the archived data, and the assembling comprises:
        determining whether the recovery instructions are to be used for an automated recovery, and
        if the recovery instructions are not to be used for an automated recovery, generating a list of user instructions for recovery, where the list of user instructions is based at least in part on the automatically gathered configuration information.

21. The method of claim 1, where the assembling comprises:
    if the recovery instructions are to be used for an automated recovery, generating a
    machine-readable list of instructions for the automated recovery.

22. The method of claim 1, where the assembling comprises:
    determining whether the recovery instructions are to be used for a hybrid recovery, and if the recovery instructions are to be used for a hybrid recovery, generating instructions for automated recovery with step-by-step options for manual override.

23. The method of claim 1, where at least one server among the plurality of servers is a virtual server, and the gathering comprises:
    gathering configuration information for the virtual server;
    gathering configuration information for a physical server that underlies the virtual server; and
    gathering hardware component configuration for the physical server that underlies the virtual server.

24. The method of claim 1, further comprising:
detecting that a server has been added or removed from a group of servers that execute a distributed application; and
in response to the detecting, modifying a definition of the plurality of servers for which the configuration information is gathered.

25. The method of claim 1, where:
the configuration information comprises information regarding a network topology of the plurality of servers.

26. A method comprising:
automatically gathering, using one or more processors, configuration information regarding a plurality of servers, where
  at least one server among the plurality of servers is a virtual server,
  the configuration information comprises information regarding data archived from each of the servers,
  the configuration information comprises configuration information for a physical server that underlies the virtual server,
  the configuration information comprises hardware component configuration information for the physical server that underlies the virtual server, and
  the configuration information comprises information for restoring the archived data onto the plurality of servers;
storing the configuration information in at least one computer readable medium;
assembling recovery instructions, where
  the recovery instructions are based at least in part on the automatically gathered configuration information,
  the recovery instructions are usable for restoring the servers, and
  the recovery instructions are usable for restoring the archived data to the servers; and
storing the recovery instructions on one or more computer-readable storage media.

27. The method of claim 26, where:
the configuration information comprises information regarding a network topology of the plurality of servers;
the gathering comprises discovering locations of the configuration information in a distributed system;
the servers execute a distributed application on two or more servers in the distributed system; and
the recovery instructions are usable for restoring the distributed application.

28. The method of claim 26, where the gathering comprises:
monitoring the servers for data backup jobs; and
gathering the configuration information in response to the data backup jobs.

29. The method of claim 26, further comprising:
detecting that a server has been added or removed from a group of servers that execute a distributed application; and
in response to the detecting, modifying a definition of the plurality of servers for which the configuration information is gathered.

30. A system comprising:
a collection module comprising a processor and configured to gather configuration information regarding a plurality of servers, where
  at least one server among the plurality of servers is a virtual server, and the configuration information comprises
    information regarding data archived from each of the servers,
    configuration information for a physical server that underlies the virtual server,
    hardware component configuration information for the physical server that underlies the virtual server, and
    information for restoring the archived data onto the plurality of servers; and
a recovery report generation module configured to assemble the recovery instructions based at least in part on the gathered configuration information, where the recovery instructions are usable for restoring the servers.

* * * * *